(12) United States Patent
Vasanth et al.

(10) Patent No.: US 12,554,468 B1
(45) Date of Patent: Feb. 17, 2026

(54) SYSTEMS AND METHODS FOR A CUSTOMIZABLE STATE MACHINE CONTROLLER BASED APPLICATION DEPLOYMENT ENGINE

(71) Applicant: BlackRock Finance, Inc., New York, NY (US)

(72) Inventors: Infant Rosario Vasanth, New York, NY (US); Vaibhav Page, New York, NY (US)

(73) Assignee: BlackRock Finance, Inc., New York, NY (US)

( * ) Notice: Subject to any disclaimer, the term of this patent is extended or adjusted under 35 U.S.C. 154(b) by 287 days.

(21) Appl. No.: 18/322,499

(22) Filed: May 23, 2023

Related U.S. Application Data

(60) Provisional application No. 63/345,194, filed on May 24, 2022.

(51) Int. Cl.
G06F 9/445 (2018.01)
G06F 8/30 (2018.01)
G06F 8/65 (2018.01)

(52) U.S. Cl.
CPC . *G06F 8/30* (2013.01); *G06F 8/65* (2013.01)

(58) Field of Classification Search
CPC ............... G06F 9/44505; G06F 9/4411; G06F 11/1464; G06F 9/4416; G06F 2209/541; G06F 9/465; G06F 8/30; G06F 8/65
See application file for complete search history.

(56) References Cited

U.S. PATENT DOCUMENTS

| | | | |
|---|---|---|---|
| 11,237,813 B1 * | 2/2022 | Chen ..................... | G06F 18/214 |
| 2023/0125892 A1 * | 4/2023 | Albright .................. | G06F 8/65 |
| | | | 713/1 |

* cited by examiner

*Primary Examiner* — Chuck O Kendall
(74) *Attorney, Agent, or Firm* — Haynes and Boone, LLP

(57) ABSTRACT

A software deployment system may be built based on a Kubernetes-native state machine for Function-As-A-Service (FaaS) workloads. The state machine is defined as a Kubernetes Custom Resource which is a structured domain specific language that extends the Kubernetes platform by providing ability to spin managed workloads that run a custom state machine. Specifically, a controller is configured to manage control loop that monitor the state of the state machine objects deployed by the software implementation and perform reconciliation to move current state to a desired state.

20 Claims, 11 Drawing Sheets

Edit Transform State

State Name
```
transform-state-1683738919009
```

Learn more about transform syntax at

Transform
```
{
  "stringTransformer": {
    {
      "path": "lastName",
      "template": "{{ .input | upper }}"
    },
    {
      "path": "firstName",
      "template": "{{ .input | upper }}"
    }
  },
  "numberTransformer": {
    {
      "path": "height",
      "type": "addition",
      "value": 10
    }
  }
}
```

HELP

UPDATE    CLOSE

Figure 6C

Edit API State

State Name
api-state-1683739656161

API Token
<token>

HTTP Method
GET

API URL
https://api-url.com/v1/models/m1

Override URL with Parameters ⓘ

⑦ HELP

Figure 6D

SYSTEMS AND METHODS FOR A CUSTOMIZABLE STATE MACHINE CONTROLLER BASED APPLICATION DEPLOYMENT ENGINE

CROSS REFERENCE(S)

The present application is a nonprovisional of and claims priority under 35 U.S.C. 119 to commonly-owned U.S. provisional application No. 63/345,194, filed May 24, 2022, which is hereby expressly incorporated by reference herein in its entirety.

TECHNICAL FIELD

The present application generally relates to dynamic system control, and more specifically to systems and methods for customized state machine controlling in application deployment.

BACKGROUND

Financial institutions often need to deploy applications to its customers. One example may be an extract, transform and load (ETL) data pipeline, which is a data integration process for transferring data from one system to another or preparing data for analysis, reporting, or business intelligence. Such an ETL pipeline is typically automated and can run on a schedule or triggered by specific events. It is a crucial component of modern data architectures and is widely used in data-driven organizations. On the other hand, when an ETL pipeline is to be deployed in a dynamic system, such as one affected by the financial market whose behavior can be unpredictable and subject to sudden shifts and changes, there is a need for handling changing data sources and evolving events with accuracy and efficiency.

BRIEF DESCRIPTION OF THE DRAWINGS

FIGS. 6A-6D provide example UI diagrams illustrating aspects of user configuration of the state machine execution process described in FIGS. 3-4, according to embodiments described herein.

Figure 1:
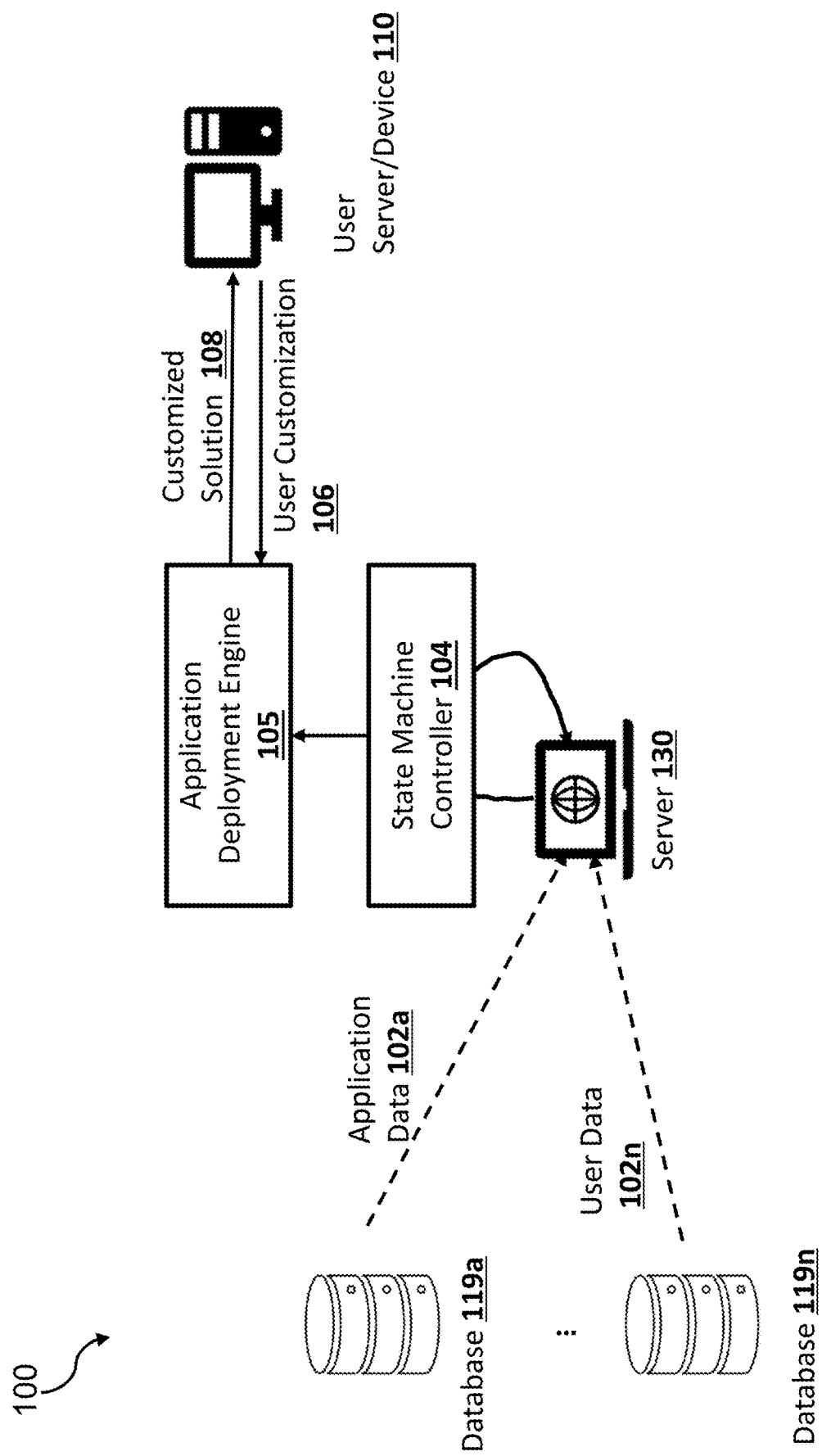
FIG. 1 provides a block diagram illustrating an example aspect of state machine control based application deployment framework, according to embodiments described herein.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for state machine controlling in a programming environment. Systems suitable for practicing methods of the present disclosure are also provided.

As used herein, a "state machine" refers to a computational model implemented on a hardware platform, which consists of a set of states, inputs, and transitions. The state machine transitions from one state to another based on inputs it receives, and the behavior of the machine can be described using a set of rules. A state machine pod runs a software application that implements the state machine and transitions between the different states based on the inputs it receives. The state machine is implemented on software, hardware and/or a combination thereof.

Dynamic systems may often entail unpredictable behaviors, and sometimes subject to sudden shifts and changes, such as a financial and/or trading system that reacts to a financial market. Managing an ETL pipeline to intake data within a dynamic system with many evolving events can be challenging due to the following difficulties. For example, a dynamic system generates large volumes of data at high velocity, which can make it challenging to process and analyze the data in a timely and efficient manner. For another example, as the system evolves and generates new types of data, the quality and consistency of the data may become harder to manage. This can result in data inconsistencies, errors, or missing values, which can impact downstream analytics and decision-making. Also as the system evolves, the data formats and structures may change, which can make it challenging to maintain the ETL pipeline and keep it up-to-date with the latest data sources. In addition, integration with multiple data sources can often be entailed. A dynamic system may involve multiple data sources, each with their own data formats and structures. Integrating data from these sources into a unified format can be difficult and time-consuming. With the rapidly changing system dynamics, the ETL pipeline must be monitored and maintained to ensure that it is running smoothly and processing data correctly. As the system evolves, the ETL pipeline may need to be updated and modified to accommodate new data sources or changes in the data format or structure.

Therefore, to manage these difficulties, it is important to have a well-designed ETL architecture that can handle changing data sources and evolving events, along with robust data quality and monitoring processes to ensure the accuracy and consistency of the data. Additionally, automated testing and validation can help detect issues early in the pipeline, and continuous integration and deployment can streamline the process of updating the ETL pipeline.

On the other hand, dynamic systems can often be controlled via software tools deployed on a centralized, and/or distributed systems. Embodiments described herein provide a software deployment system that is built based on a Kubernetes-native state machine for Function-As-A-Service (FaaS) workloads for a user to customize and adapt to any desired downstream task. The state machine is defined as a Kubernetes Custom Resource which is a structured domain specific language that extends the Kubernetes platform by providing ability to spin managed workloads that run a custom state machine. Specifically, a controller is configured to manage a control loop that monitors the state of the state machine objects deployed by the software implementation and performs reconciliation to move current state to a desired state. For example, a user and/or a client may customize the state machine, via a user interface, by defining user-customized states and state transition rules to facilitate the transition between the states. In this way, the software deployment infrastructure may adaptively allow a user to customize any software platform, application program interface (API) according to the user desired functions, and seamlessly execute a user configured downstream task and deliver downstream task results to the user.

In this way, the state machine is run as a pod which is customizable per user needs, and also yields the ability to scale the state machine horizontally, easily update its configuration, and monitor its health and performance.

FIG. 1 provides a block diagram 100 illustrating an example aspect of state machine control based application deployment framework, according to embodiments described herein. Diagram 100 shows a server 130, various databases 119a-n, a user device or server 110, and/or the like interacting with each other, e.g., via a communication network.

In diagram 100, databases (or event databases) 119a-n are shown for illustrative purposes, while any number of databases may be communicative with the server 130. Each of event databases 110a-n may store various data. For example, each database 119a-n may provide remote access to the server 130 via a communication network, various data depending on a specific application or task needs, such as application 102a, user data 102n, and/or the like. The server 130 may update data with the databases 119a-n periodically, intermittently, on demand and/or automatically in a real time manner when there is a data update at the database side.

In one embodiment, the server 130 may optionally receive data 102a-n from the databases 119a-n (which can be remote from server 130) for application deployment, as illustrated by the dashed lines. For example, when the application deployment entails an ETL process, the server 130 may intake various raw data from the databases 119a-n.

In one embodiment, the server 130 may be a cloud computing platform that employs a state machine controller 104 and an application deployment engine 105. Specifically, the state machine controller 104 may be implemented as a Kubernetes-native state machine that controls and manages Function-As-A-Service (FaaS) workloads, whereas the application deployment engine 105 may deploy applications to the cloud and/or provide service to a user according to the state machine status.

In one implementation, such FaaS workloads may include a set of functions or code snippets that are deployed and executed on a FaaS platform. These workloads can range from simple single-purpose functions, such as image resizing or text processing, to more complex workflows that orchestrate multiple functions together to achieve a specific task. For instance, such FaaS functions controlled by the state machine controller 104 and/or deployed by the application deployment engine 105 may include data processing functions that are used to process and transform raw data 102a-n in real-time as raw data flows through an application. For example, a function might be used to filter or aggregate data from multiple sources, such as social media feeds or Internet of Things (IoT) sensors. As another example, such FaaS functions may include a chatbot application to build conversational chatbots that can interact with users in natural language, which analyzes a user's message, determines the intent, and generates an appropriate response. As another example, such FaaS functions may include event-driven computing that responds to events, such as a user clicking a button or a new message arriving in a queue. For example, a function might be triggered to send an email or update a database when a specific event occurs. As another example, such FaaS functions may include serverless application programming interfaces (APIs), which creates lightweight APIs that expose specific functionality or data to other applications. For example, a function might be used to provide access to a database or generate reports on demand.

In one embodiment, the state machine controller 104 may define a state machine as a Kubernetes Custom Resource (CR) which is a structured domain specific language that extends the Kubernetes platform by providing ability to spin managed workloads that run a custom state machine. For example, the application deployment engine 105 may receive user or customer configuration 106, which includes user customized definitions of states and transition rules between the states. State machines are then deployed as Kubernetes pods by the state machine controller 104 and executes the desired set of states and transitions between the states. An example application deployed by the application deployment engine 105 controlled by the state machine controller 104 includes a financial data quality control process, which is further illustrated in FIG. 4.

In one embodiment, the state machine controller 104 and/or the underlying state machine may comprise and/or be implemented on hardware such as but not limited to digital logic circuits, such as integrated circuits (ICs) or programmable logic devices (PLDs) such as a field programmable gate array (FPGA) circuit. These circuits are designed to perform specific logic functions and can be configured to create sequential circuits that represent the states, and controls the transitions, and outputs of the state machine. For example, a state machine could be implemented using logic gates and flip-flops on an FPGA, where the states are represented by the states of the flip-flops, and the transitions between states are determined by the inputs and the current state. The specific state definitions and state transition rules may be programmed to the FPGA circuit via programming tools such as software applications or command-line utilities that interface with the FPGA development board or programmer.

Figure 4:
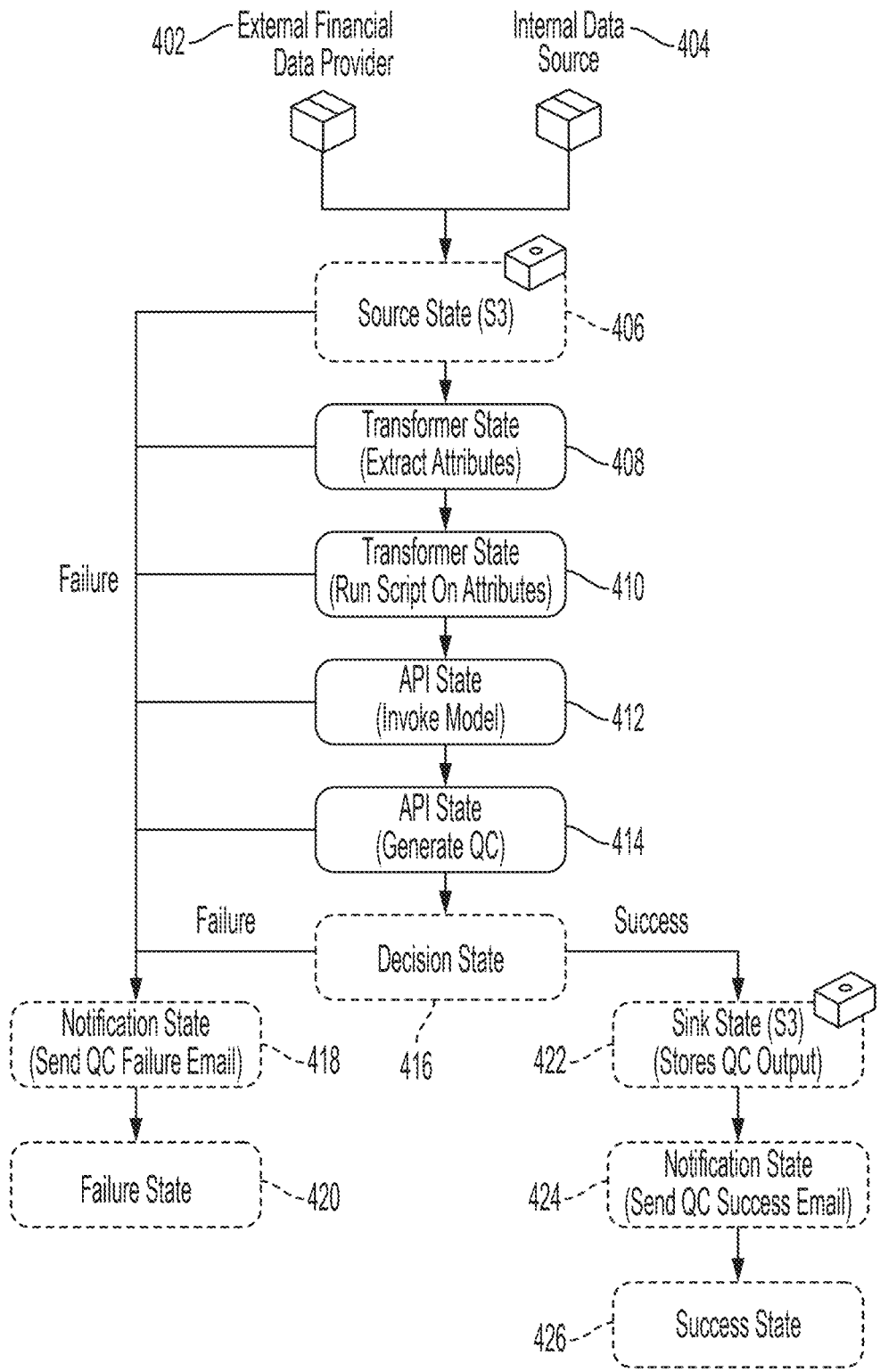
FIG. 4 is an example diagram illustrating a use case of financial server quality control using the state machine infrastructure described in FIG. 3, according to embodiments described herein.

In one embodiment, the outputs of the state machine can control other components or affect the behavior of the overall system, such as in an ETL process, a financial data quality control process described in FIG. 4, and/or the like.

In one embodiment, the application deployment engine 105 may manage and deploy cloud computing services that allow developers to deploy individual functions or pieces of code to the cloud, without having to worry about the underlying infrastructure or server management. The application deployment engine 105 may comprise an application programming interface (API) for deploying and executing the deployed application, e.g., by delivering the execution solution 106 to a user device and/or server 110 through the API over the network.

In another embodiment, upon the user device and/or server 110 configuring desired state definitions through user customization (which can include parameters) 106, the server 130 may execute the customized state machine to generate a downstream task solution, such as a task output 108 for delivery to the user device 110.

Figure 2:
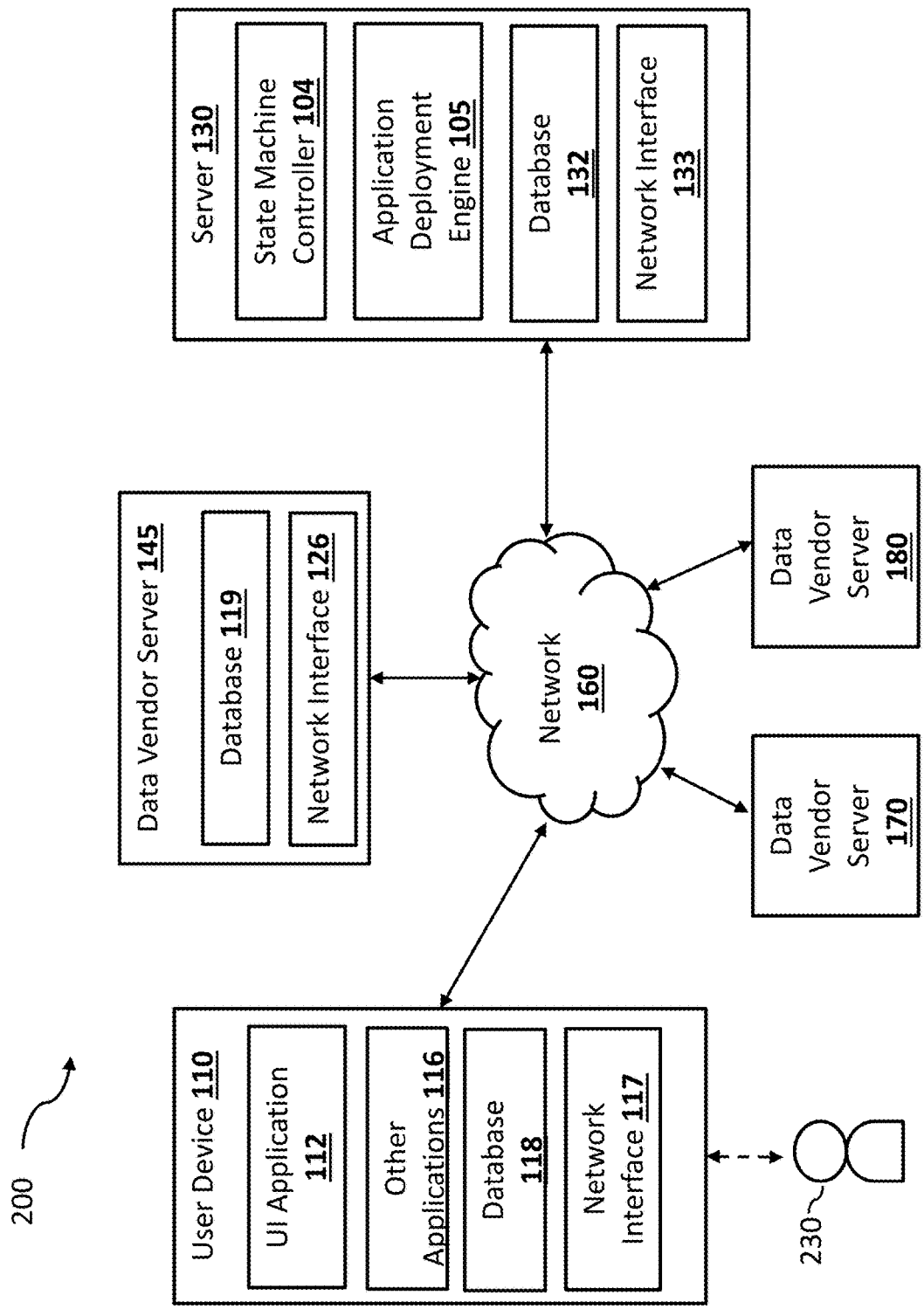
FIG. 2 is a block diagram of a networked system suitable for implementing the processes described in FIG. 1 and other embodiments described herein, according to an embodiment.

FIG. 2 is a block diagram 200 of a networked system suitable for implementing the processes described in FIG. 1 and other embodiments described herein, according to an embodiment. In one embodiment, block diagram 200 shows a system including the user device 110 which may be operated by a user 230, data vendor servers 145, 170 and 180, server 130, and other forms of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device and/or server 110, data vendor servers 145, 170 and 180, and the server 130 may communicate with each other over a network 160. User device 110 may be utilized by user 240 to access the various features available for user device 110, which may include processes and/or applications associated with the server 130 to receive an output of capital crowding prediction (e.g., 108 in FIG. 1).

User device 110, data vendor server 145, and the server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 160.

User device 110 may be implemented as a communication device that may utilize appropriate hardware and software configured for wired and/or wireless communication with data vendor server 145 and/or the server 130. For example, in one embodiment, user device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 110 of FIG. 2 contains a user interface (UI) application 112, and/or other applications 116, which may correspond to executable processes, procedures, and/or applications with associated hardware. For example, the user device 110 may configure state definitions with the server 130 via the UI application 112, as shown in FIGS. 6A-6D. In other embodiments, user device 110 may include additional or different modules having specialized hardware and/or software as required.

In various embodiments, user device 110 includes other applications 116 as may be desired in particular embodiments to provide features to user device 110. For example, other applications 116 may include security applications for implementing client-side security features, programmatic client applications for interfacing with appropriate application programming interfaces (APIs) over network 160, or other types of applications. Other applications 116 may also include communication applications, such as email, texting, voice, social networking, and IM applications that allow a user to send and receive emails, calls, texts, and other notifications through network 160. For example, the other application 116 may be an email or instant messaging application that receives a data anomaly message from the server 130. Other applications 116 may include device interfaces and other display modules that may receive input and/or output information. For example, other applications 116 may contain software programs, executable by a processor, including a graphical user interface (GUI) configured to provide an interface to the user.

User device 110 may further include a database 118 stored in a transitory and/or non-transitory memory of user device 110, which may store various applications and data and be utilized during execution of various modules of user device 110. Database 118 may store user customization including state definitions 106, generated execution solution and/or results 108, and/or the like. In some embodiments, database 118 may be local to user device 110. However, in other embodiments, database 118 may be external to user device 110 and accessible by user device 110, including cloud storage systems and/or databases that are accessible over network 160.

User device 110 includes at least one network interface component 117 adapted to communicate with data vendor server 145 and/or the server 130. In various embodiments, network interface component 117 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 145 may correspond to a server that hosts the event database 119 (e.g., similar to any of databases 119a-n) to provide data records to the server 130. For example, database 119 may be similar to any of the databases 119a-n storing financial data, user data, market data and/or the like relating to a FaaS function or application to be deployed. The database 119 may be implemented by one or more relational database, distributed databases, cloud databases, and/or the like.

The data vendor server 145 includes at least one network interface component 126 adapted to communicate with user device 110 and/or the server 130. In various embodiments, network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 145 may send data records retrieved from a database 119, via the network interface 126, to the server 130.

The server 130 may be housed with the state machine controller 104 and/or the application deployment engine 105. The state machine controller 104 and the application deployment engine 105 may be implemented based on hardware, software or a combination thereof, and may include any cloud service modules, APIs, and/or the like. For example, the application deployment engine 105 may receive customized user definitions of state machines via a network interface 133 over the network 160 from the user device 110.

A database 132 may be stored in a transitory and/or non-transitory memory of the server 130. In various embodiments, for example, the database 132 may store raw data in the form of various financial data, user data, market data from various data vendor servers 145, 170, 180, transformed data through an ETL process that is deployed by the application deployment engine 105 according to user define state machines, state machine definitions and status, state machine execution results for a FaaS workload, and/or the like.

In some embodiments, database 132 may be local to the server 130. However, in other embodiments, database 132 may be external to the server 130 and accessible by the server 130, including cloud storage systems and/or databases that are accessible over network 160.

The server 130 includes at least one network interface component 133 adapted to communicate with user device 110 and/or data vendor servers 145, 170 or 180 over network 160. In various embodiments, network interface component 133 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 200.

Figure 3:
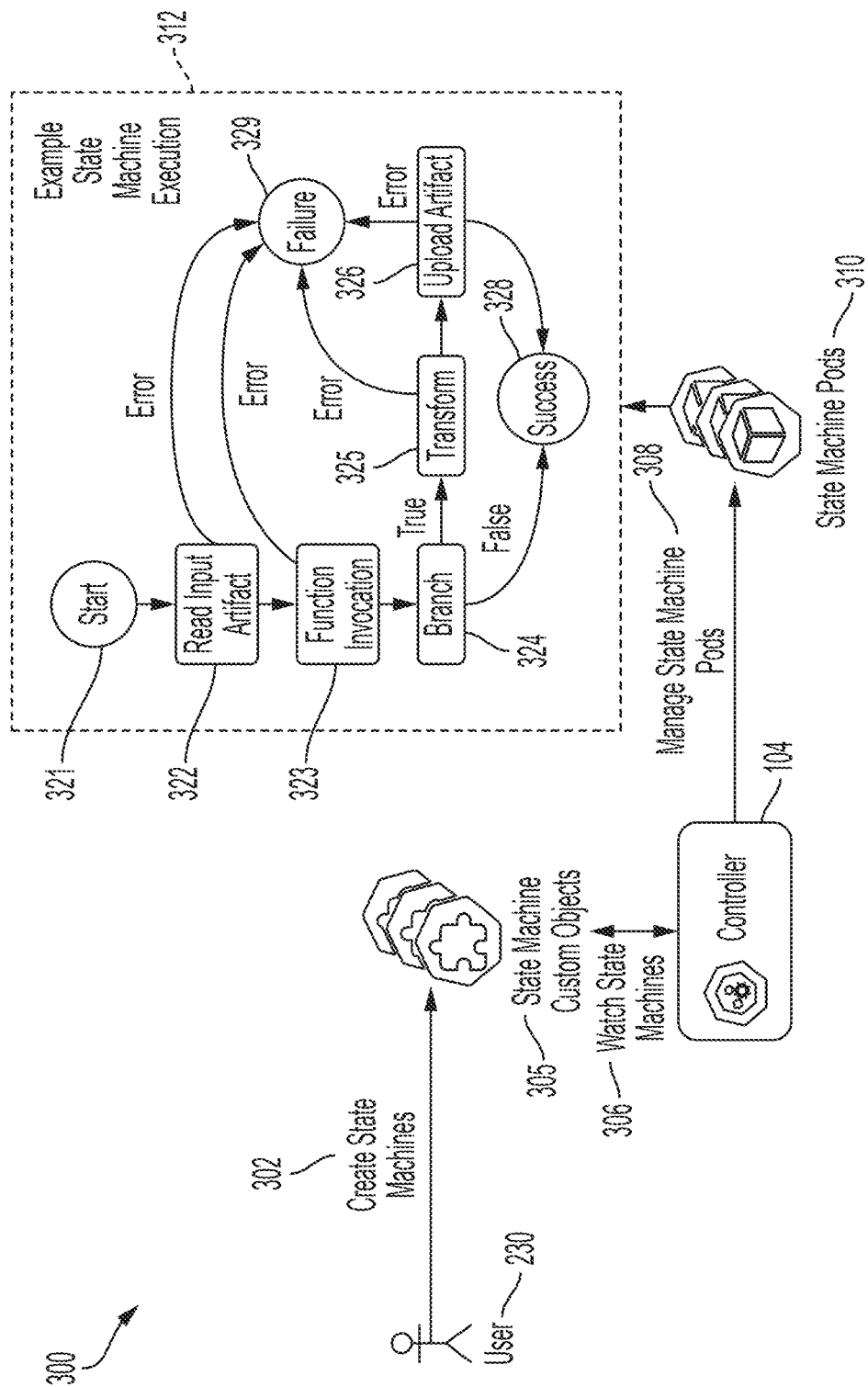
FIG. 3 is an example diagram illustrating an infrastructure of user customized state machine-based application deployment, according to embodiments described herein.

FIG. 3 is an example diagram illustrating an infrastructure 300 of user customized state machine based application deployment, according to embodiments described herein. In the infrastructure 300, state machines are deployed as Kubernetes pods by the controller and execute the desired set of states and transitions between the states.

In one embodiment, a user 230 (e.g., operating a user device 110 in FIGS. 1-2) may create customized state machines at 302, thereby resulting in the state machine custom objects 305. For example, a user may define and customize different types of states such as: Source & Sink (state that reads and writes artifacts from/to target data store), Functions (state that invokes FaaS workloads offered by a variety of cloud vendors), Branch (state that performs conditional/branching logic to determine the next state), Transform (state that transforms an input to the state into a desired output), Log (state that logs the current input to the state), Notifications (state that sends notifications via variety of messaging channels like slack, email, and/or the like), Success & Failure (a terminal state to stop the state machine), and/or the like. Example states that are customized by a user for a specific application may be found in FIG. 4.

The state machine custom objects 305 may then operate with a state machine controller 104 to watch the state machine cycles 306. Specifically, the state machine controller 104 may be a Kubernetes(K8s) controller which manages control loops that watch the state of the state machine objects deployed in K8s and perform reconciliation to move current state of state machines to the desired state. To achieve this, the state machine controller 104 may create and manage state machine pods at 308. Each state machine pod 310 is a depository in which a set of customized states may evolve according to a set of transition rules. For example, each state machine pod 310 may comprise a hardware component such as an FPGA circuit with embedded memory storing the various states. The transition of states during state machine cycles deploys and executes a specific application and/or function, e.g., data processing, ETL pipeline, step functions pipelines, engine for low code frameworks, and/or the like.

For example, during state machine execution 312, the state machine may be initiated with a Start state 321. The Start state 321 may transition to a Sink state 322 to read input artifact. For example, the Sink state 322 may be defined as a Git source state that reads a JSON artifact from a git repository and passes it as an input to the next state, such as a Function Invocation state 323. An example code snippet for executing the Git source may take a form similar to the following:

```
states:
read-artifact:
source:
git:
url:
value: your-git-url
filePath:
value: path-of-the-artifact
cloneDir:
value: directory-to-clone-the-repo
#define either branch or tag
branch:
value: master
tag:
value: v1.0.0
creds:
usernameRef: username-secret
passwordRed: password-secret
secretRefs: #K8s SecretKeySelectors
username-secret:
name: git-secret
key: username
password-secret:
name: git-secret
key: password
```

In another example, the Sink state 322 may be defined as an Azure Blob source state that reads a JSON artifact from the container and passes it as an input to the next state. An example code snippet for executing the Azure Blob source may take a form similar to the following:

```
states:
read-artifact:
source:
azureBlob:
accountNameRef: account-name-secret
accessKeyRef: access-key-secret
containerName:
value: container-name
blobName:
value: blob-name
secretRefs: #K8s SecretKeySelectors
account-name-secret:
name: azure-blob-secret
key: account-name
access-key-secret:
name: azure-blob-secret
key: access-key
```

In another example, the Sink state 322 may be defined as an Inline source state that reads JSON artifact from the state manifest and passes it as an input to the next state. An example code snippet for executing the Inline source may take a form similar to the following:
    states:
    read-artifact:
    source:
    inline: |—
    {"hello": "world"}
In another example, the Sink state 322 may be defined as a URL source state that reads JSON artifact hosted on the web server and passes it as an input to the next state. An example code snippet for executing the URL source may take a form similar to the following:
    states:
    read-artifact:
    source:
    url:
    path:
    value: https://example-artifact.com/
    insecure: false
In another example, the Sink state 322 may be defined as a GCP storage source state that reads JSON artifact from GCP Cloud Storage and passes it as an input to the next state. An example code snippet for executing the GCP storage source may take a form similar to the following:
    states:
    read-artifact:
    source:
    gcpStorage:
    applicationCredentialsRef: application-creds-secret
    projectID:
    value: project-id
    bucket:
    value: bucket-name
    objectName:
    value: object-name
    secretRefs: #K8s SecretKeySelectors
    application-creds-secret:
    name: application-creds
    key: creds
In another example, the Sink state 322 may be defined as an Alibaba OSS source state that reads JSON artifact from the Alibaba OSS bucket and passes it as an input to the next state. An example code snippet for executing the Alibaba OSS source may take a form similar to the following:
    states:
    read-artifact:
    source:
    alibabaOSS:
    endpoint:
    value: endpoint-value
    bucket:
    value: example-bucket
    objectKey:
    value: object-keyus-east-1
    accessKeyRef: access-key-secret
    accessIDRef: access-id-secret
    secretRefs: #K8s SecretKeySelectors
    access-key-secret:
    name: access-secret
    key: access-key
    access-id-secret:
    name: access-secret
    key: access-id
In another example, the Sink state 322 may be defined as a generator source state that evaluates a Lua script to generate dynamic JSON artifacts. An example code snippet for executing the generator source may take a form similar to the following:
    states:
    read-artifact:
    source:
    generator: |—
    return "{\"a\":\"b\"}"
The input to the state is made available to the Lua script through a global variable.

Back to the example state machine execution 312, if a read error occurs, the state machine may transition to the Failure state 329. An example code snippet for executing the Start state 321 may take a form similar to the following:
    cat <<EOF|kubectl-n trolley apply-f—
    kind: StateMachine
    metadata:
    name: example
    spec:
    entrypoint: read-artifact #the start state
    states:
    read-artifact: #state name
    source:
    inline: |—
    {"hello": "world" }
    failure: stop-with-error
    next: transform-input
    transform-input:
    transform:
    stringTransformer:
    —path: hello
    template: "{{.Input|upper}}" #converts "hello" to "HELLO"
    failure: stop-with-error
    next: log-input
    log-input: #logs the input to the state
    log:
    next: stop-with-success
    stop-with-success: #stops the machine with success
    success:
    message: machine ran successfully
    stop-with-error: #stops the machine with an error
    failure:
    message: machine failed
    EOF The state machine may transition from Read state 322 to a Function Invocation state 323. For example, the Function Invocation state 323 executes serverless workloads offered by a variety of cloud vendors (e.g., data vendors 145, 170, 180 in FIG. 2). For example, for HTTP function, the Function Invocation state 323 may invoke an endpoint over HTTP to execute a generic API/FaaS workload, e.g., using POST method. The input to the state is passed as HTTP request payload. Output of the call is passed as the input to the next state. An example code snippet for executing an HTTP function may take a form similar to the following:
    states:
    execute-http:
    function:
    http:
    url:
    value: https://hello-world/v1
    headers: #optional
    key1: value2
    key2: value2
    timeout: #optional
    value: 60 #seconds

```
creds: #basic auth. optional
usernameRef: username-secret
passwordRed: password-secret
accessTokenRef: access-token-secret  #bearer token.
    optional
secretRefs:
username-secret:
name: http-secret
key: username
password-secret:
name: http-secret
key: password
access-token-secret:
name: http-secret
key: access-token
```

For another example, the Function Invocation state 323 may invoke an Amazon® web service (AWS) Lambda function, the input to which is passed as payload to the Lambda invocation. An example code snippet for executing an AWS Lambda function may take a form similar to the following:

```
states:
execute-lambda:
function:
lambda:
functionName:
value: function-name
region:
value: us-east-1
accessKeyRef: access-key-secret
secretKeyRef: secret-key-secret
secretRefs:
access-key-secret:
name: lambda-secret
key: access-key
secret-key-secret:
name: lambda-secret
key: secret-key
```

For another example, the Function Invocation state 323 may invoke an Oracle® function for database service. An example code snippet for executing an Oracle function may take a form similar to the following:

```
states:
execute-oracleFunction-function:
function:
oracleFunction:
endpoint:
value: endpoint
functionID:
value: function-id
oboTokenRef: obo-token-secret
secretRefs:
obo-token-secret:
name: obo-token-secret
key: obo-token
```

Back to the state machine execution 312, if a function invocation error occurs, the state machine may transition to the Failure state 329. Otherwise, the state machine transits to a Branch state 324 during execution of the function, e.g., any conditional logic such as "whether the data requires further transformation or preprocessing." The Branch state 324 evaluates a conditional logic and decides the next transition for the state machine. An example code snippet for executing a Branch state may take a form similar to the following:

```
#Input to the branch state
#{
#"firstName":"abc",
#"lastName":"xyz",
#"address":"random street",
#}
states:
if-else: #name of the state
branch:
variables: #variables required for the conditional logic
—name: a #name of the variable. It be any valid GO
    variable name path: firstName #value derived from
    "firstName" field from input JSON
type: string #type of the variable
—name: b
path: lastName
type: string
condition: a=="abc" && b=="xyz"
next: name-of-the-state #if condition evaluates to true
failure: name-of-the-state #if condition evaluates to false
```

The above branch state defines two variables, a and b. The type of each of variable is represented by the field type and the value is set by selecting a path within input payload. In this case, a value of a would be set as abc and the value of b would be set as xyz. Once the variables are declared, the next step is to define the condition. The condition is a free form boolean logic which is evaluated to determine the outcome of the branch. In the above example, the condition checks whether a has value of abc and b has value of xyz. If the condition evaluates Truth, then the state machine transitions to the state defined under the next field; otherwise, it transitions to the state defined under the failure field.

In one embodiment, if the conditional logic is true, the state machine may transit to the Transform state 325 to transform input data. The Transform state 325 applies transformations on the input JSON and pass the result to the next state. For example, a string Transform function applies string transformations on a path within input payload. It uses Sprig Templates to transform the string. An example code snippet for a string transformation may take a form similar to the following:

```
#Input to the state
#{
#"hello": "hello"
#}
#Output
#{
#"hello": "HELLO"
#}
states:
transform-input: #state name
transform:
stringTransformer: #uses Sprig template for transformation
—path: hello
template: "{{.Input|upper}}" #converts "hello" to
    "HELLO"
```

For another example, a numeric transformation function applies numeric transformations on a path within an input payload. It supports addition, subtraction, division and multiplication operations. An example code snippet for a numeric transformation may take a form similar to the following: #Input to the state

```
{
#"a": 10
#}
#Output
#{
#"a": 20
#}
```

```
states:
transform-input: #state name
transform:
numericTransformer:
path: a
type: addition
value: 10 #adds 10 to the value of "a"
```
For another example, a map transformation masks the value at a path within input JSON payload to hide sensitive information. An example code snippet for a mask transformation may take a form similar to the following:
```
#Input to the state
#{
#"hello": "abcdefg"
#}
#Output
#{
#"hello": "ab**efg"
#}
states:
transform-input: #state name
transform:
mask:
—path: hello
startAt: 2 #starts masking value from 2nd index. Index starts at 0
endAt: 4 #ends masking value before 4th index
```
For another example, a map transformation maps a path within input JSON payload as a new field. This is useful when a user wants to extract a nested path within input JSON and make it available as a top-level field. An example code snippet for a map transformation may take a form similar to the following:
```
#Input to the state
#{
#"hello": "world"
}
#{
#"hello": "world"
#"anotherHello": "world"
#}
states:
transform-input: #state name
transform:
map: #takes the value from source and maps it to a new value at the destination key.
—source: hello
destination: anotherHello
```
In one embodiment, if any transformation error occurs, the state machine transits to the Failure state 329. Otherwise, the state machine transits to the Sink state 326 to upload and writes the transformed data artifact to a target data store. For example, a S3 sink state writes the current input to the state as a JSON artifact to S3 bucket. An example code snippet for a S3 sink may take a form similar to the following:
```
states:
write-artifact:
sink:
s3:
endpoint:
value: your-s3-endpoint
bucket:
value: example-bucket
key:
value: example-key
region:
value: us-east-1
accessKeyRef: access-key-secret
secretKeyRef: secret-key-secret
secretRefs: #K8s SecretKeySelectors
access-key-secret:
name: s3-secret
key: access-key
secret-key-secret:
name: s3-secret
key: secret-key
```
In above example, the state write-artifact writes the input as a JSON artifact example-key to the example-bucket bucket.

In another example, the Sink state 326 may be defined as an Azure Blob sink state that writes the current input to the state as a JSON artifact to the blob container. An example code snippet for an Azure Blob sink state may take a form similar to the following:
```
states:
write-artifact:
sink:
azureBlob:
accountNameRef: account-name-secret
accessKeyRef: access-key-secret
containerName:
value: container-name
blobName:
value: blob-name
secretRefs: #K8s SecretKeySelectors
account-name-secret:
name: azure-blob-secret
key: account-name
access-key-secret:
name: azure-blob-secret
key: access-key
```
In another example, the Sink state 326 may be defined as an Azure Blob sink state that writes the current input to the state as a JSON artifact to the blob container. An example code snippet for an Azure Blob sink state may take a form similar to the following:
```
states:
write-artifact:
sink:
azureBlob:
accountNameRef: account-name-secret
accessKeyRef: access-key-secret
containerName:
value: container-name
blobName:
value: blob-name
secretRefs: #K8s SecretKeySelectors
account-name-secret:
name: azure-blob-secret
key: account-name
access-key-secret:
name: azure-blob-secret
key: access-key
```
In another example, the Sink state 326 may be defined as a GCP storage sink state that writes the input to the state as JSON artifact to the GCP Cloud Storage bucket. An example code snippet for a GCP storage sink state may take a form similar to the following:
```
states:
write-artifact:
sink:
gcpStorage:
applicationCredentialsRef: application-creds-secret
```

```
projectID:
value: project-id
bucket:
value: bucket-name
objectName:
value: object-name
secretRefs: #K8s SecretKeySelectors
application-creds-secret:
name: application-creds
key: creds
```
In another example, the Sink state 326 may be defined as an Alibaba OSS sink state that writes the input to the state as JSON artifact to the Alibaba OSS bucket. An example code snippet for an Alibaba OSS sink state may take a form similar to the following:
```
states:
write-artifact:
sink:
alibabaOSS:
endpoint:
value: endpoint-value
bucket:
value: example-bucket
objectKey:
value: object-keyus-east-1
accessKeyRef: access-key-secret
accessIDRef: access-id-secret
secretRefs: #K8s SecretKeySelectors
access-key-secret:
name: access-secret
key: access-key
access-id-secret:
name: access-secret
key: access-id
```
Back to the example state machine execution 312, depending on the uploading status, the state machine may transit to Failures state 329 when there is upload error, or transit to the desired Success state 328 when the upload is successful.

On the other hand, at the Branch state 324, if it is decided there is no need for further transformation, the state machine may transition to the desired Success state 328, which marks the end of the machine execution. An example code snippet for a Success state may take a form similar to the following:
```
states:
stop-with-success:
success:
message: machine completed successfully
stop-with-error:
failure:
message: machine failed
```
It is to be noted that the collection of state types shown in the state machine execution 312 is for illustrative purpose only. Other types of states and/or functions may include a Parameters setting state that lets a user to set value for the fields in a state. An example code snippet for a Parameters setting state may take a form similar to the following:
```
#Input to the state
#{
#"function": {
#"name": "my-awesome-function",
#},
#}
states:
execute-lambda:
function:
lambda:
functionName:
value: my-function
#In above state snippet, "my-function" is set as the value
    for "functionName" field.
#But, in many cases, you many want to assign the value
    from the input field to the state field.
#This is done using "valueFrom" field in a parameter.
states:
execute-lambda:
function:
lambda:
functionName:
valueFrom: function.name #sets "my-awesome-function
    as a value to the "functionName" field.
```
Another example is an Output selection state for certain type of the state, such that the state machine may merge result with the input to the state, discard the current result, select a subpath from the current result, or run an arbitrary Lua script that processes the current result. For example, the following code snippets merges the current result as a sub object into the input to the state:
```
#Input to the state
#{
#"hello": "world",
#"a": "b"
#}
#Current result of the state
#{
#"c": {
#"d": "e"
#}
}
#Final result after mergeWithPrevious
#{
#"hello": "world",
#"a": "b",
#"c": {
#"d": "e"
#}
}
mergeWithPrevious:
name: c
path: c
#Input to the state
#{
"a": "b"
#}
states:
read-artifact:
source:
inline: |—
{"hello": "world" }
output:
mergeWithPrevious:
name: hello
path: hello
```
Output generated for above state is as follows,
```
{
"a": "b"
"hello": "world"
}
```
For another example, the following code snippets merges input to the state into the current result:
```
#Input to the state
#{
#"hello": "world",
#"a": "b"
```

```
#}
#Current result of the state
#{
#"c": {
#"d": "e"
#}
}
#Final result after mergeWithCurrent
#{
#"c": {
#"d": "e"
#}
#"hello": "world",
#}
mergeWithCurrent:
name: hello
path: hello
```

For another example, the following code snippets discards the current result:

```
#Input to the state
#{
#"hello": "world",
#"a": "b"
#}
#Current result of the state
#{
#"c": {
#"d": "e"
#}
}
#Final result after discard
#{
#"hello": "world",
#"a": "b"
#}
discard: true
```

For another example, the following code snippet selects a sub path from the current result:

```
#Current result of the state
#{
#"c": {
#"d": "e"
#}
}
#Final result after subpath
#{
#"d": "e"
#}
subPath: c.d
```

For another example, the state machine may execute an arbitrary Lua script that can process input to the state and the current result and generate a new result:

```
#Input to the state
#{
#"hello": "world",
#"a": "b"
#}
#Current result of the state
#{
#"c": {
#"d": "e"
#}
}
#The input to the state is passed to the Lua script through a global variable
#called "oldPayload" of type table.
#The current result of the state is passed to the Lua script through a global variable
#called "currentPayload" of type table.
#The script must return a table that represents a valid JSON object.
#Final result after applying Lua script
#{
#"c": {
#"d": "f"
#}
}
script:|—
currentPayload.c.d="f"
return currentPayload
```

FIG. 4 is an example diagram illustrating a use case of financial server quality control using the state machine infrastructure described in FIG. 3, according to embodiments described herein. As shown in FIG. 4, to implement a financial data quality control application, a user and/or a client may define a set of states with the state machine. The state machine may receive various raw financial data from external financial data provider 402 (e.g., data vendors 145, 170 and 180 in FIG. 2) and/or an internal data source 404 (e.g., database 132 in FIG. 2).

For example, the state machine may start with a Source state 406, which reads an artifact from the target datastore (e.g., 402 or 404) and passes it as an input to the next state 408. Here the Source state 406 is defined as reading data from external data providers, internal APIs, databases and data gateways and/or the like, and is stored on S3 and is read by the Source state. An example S3 source state reads a JSON artifact from the S3 bucket and passes it as an input to the next state as following:

```
states:
read-artifact:
source:
s3:
endpoint:
value: your-s3-endpoint
bucket:
value: example-bucket
key:
value: example-key
region:
value: us-east-1
accessKeyRef: access-key-secret
secretKeyRef: secret-key-secret
secretRefs: #K8s SecretKeySelectors
access-key-secret:
name: s3-secret
key: access-key
secret-key-secret:
name: s3-secret
key: secret-key
```

In above example, the state read-artifact reads JSON artifact example-key stored in the example-bucket bucket.

The S3 Source state 406 may transition to the Transformer state 408, which is defined as a Map state using mapping feature of transform state and extract necessary attributes from input data. The Transformer state 408 may then transition to Transformer state 410, which is defined to use string and numeric transformations to transform extracted attribute suitable for use by a financial model. The Transformer state 410 may then transition to an API State 412, which is defined to invoke a financial model using API state. These financial models are invoked by making HTTP calls, e.g., as described in relation to state 323 in FIG. 3.

The API state 412 may then transition to another API State 414, which may feed the output of the financial model to the quality control process by an API call. The API state 414 may then transition to a Decision state 416 (e.g., redefined from the Branch state 324 in FIG. 3). Output of the quality control call is passed on to the Decision state 416 to determine whether the attributes of quality control have passed certain criteria.

When an error or failure occurs in any of the states 406-416, the state machine transitions to a Notification state 418 that sends a failure message (e.g., via email, instant message, auto-call, cloud messaging, and/or the like) to the user and terminates the state machine at Failure state 420.

When the Decision state 416 determines that the attributes of quality control have passed certain criteria, the state machine transitions to a Sink state 422, which writes an artifact to the target datastore. Here, an example S3 sink state writes the current input to the state as a JSON artifact to S3 bucket: states:
write-artifact:
sink:
s3:
endpoint:
value: your-s3-endpoint
bucket:
value: example-bucket
key:
value: example-key
region:
value: us-east-1
accessKeyRef: access-key-secret
secretKeyRef: secret-key-secret
secretRefs: #K8s SecretKeySelectors
access-key-secret:
name: s3-secret
key: access-key
secret-key-secret:
name: s3-secret
key: secret-key In above example, the state write-artifact writes the input as a JSON artifact example-key to the example-bucket bucket. After successful writes, the state machine may then transition to a Notification state 424, which may send a notification message to the user about the success in quality control, and terminates the process in a Success state 426.

In one embodiment, when the state machine controller 104 comprises and/or is implemented on an FPGA circuit and/or other programmable logic device as discussed in relation to FIG. 1, the various example code snippets implementing various states may be used to configure the hardware-based state machine. For example, the code snippets may be generated into a bitstream file, which contains the configuration data for the underlying FPGA and/or other type of programmable circuit. The bitstream is specific to the programmable circuit and represents the specific configuration of the logic elements and interconnections according to the target functionality, e.g., different definitions of states and the transition rules. The bitstream may then be programmed onto the FPGA circuit and/or other type of programmable circuit using a specific programming tool provided by the FPGA vendor, such as but not limited to XILINX® FPGA programming tool, and/or the like.

Figure 5A:
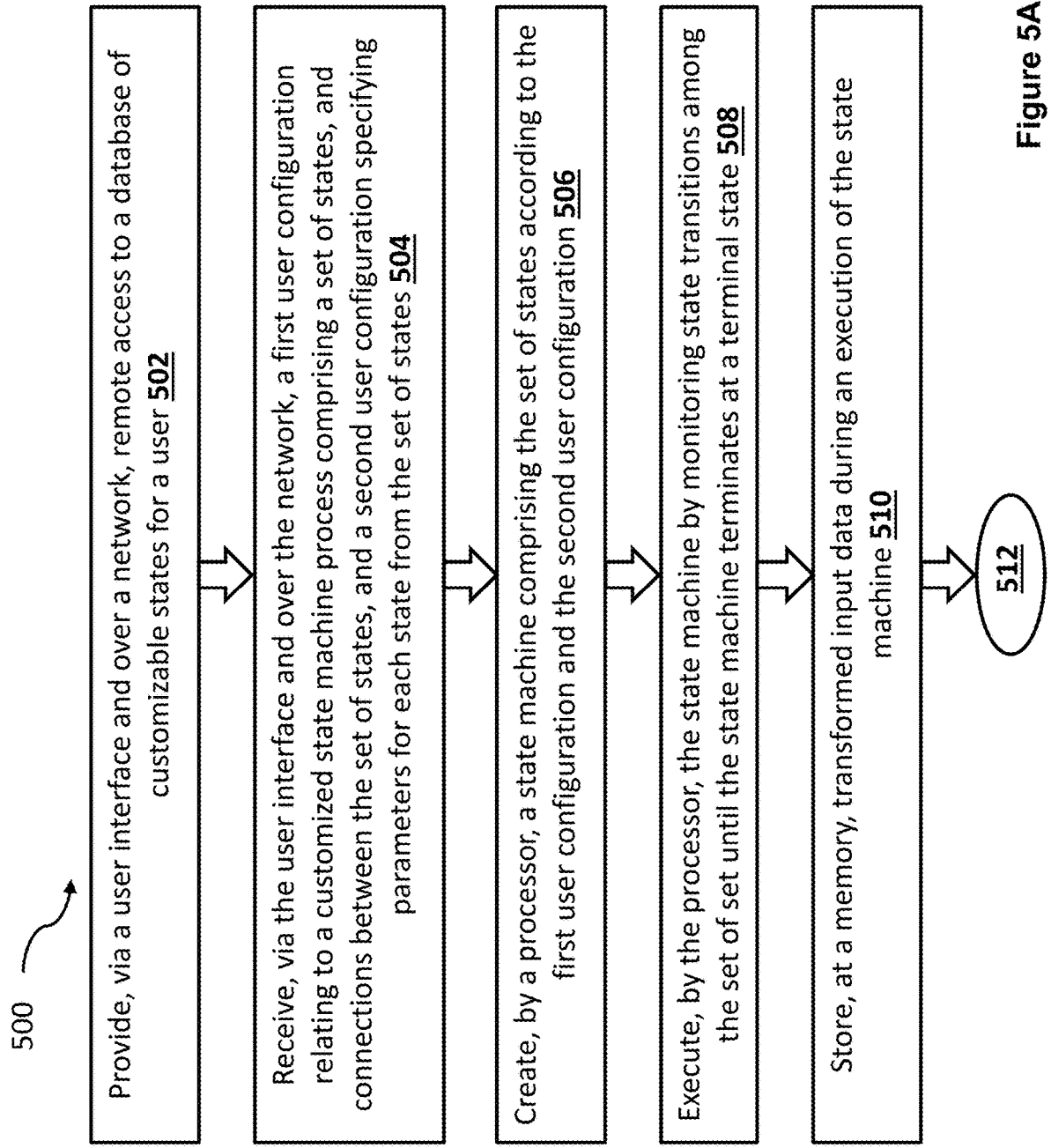
FIGS. 5A-5B provide a flow diagram of an exemplary process for operating cloud-based application deployment using a user customized state machine, according to an embodiment.
Figure 5B:
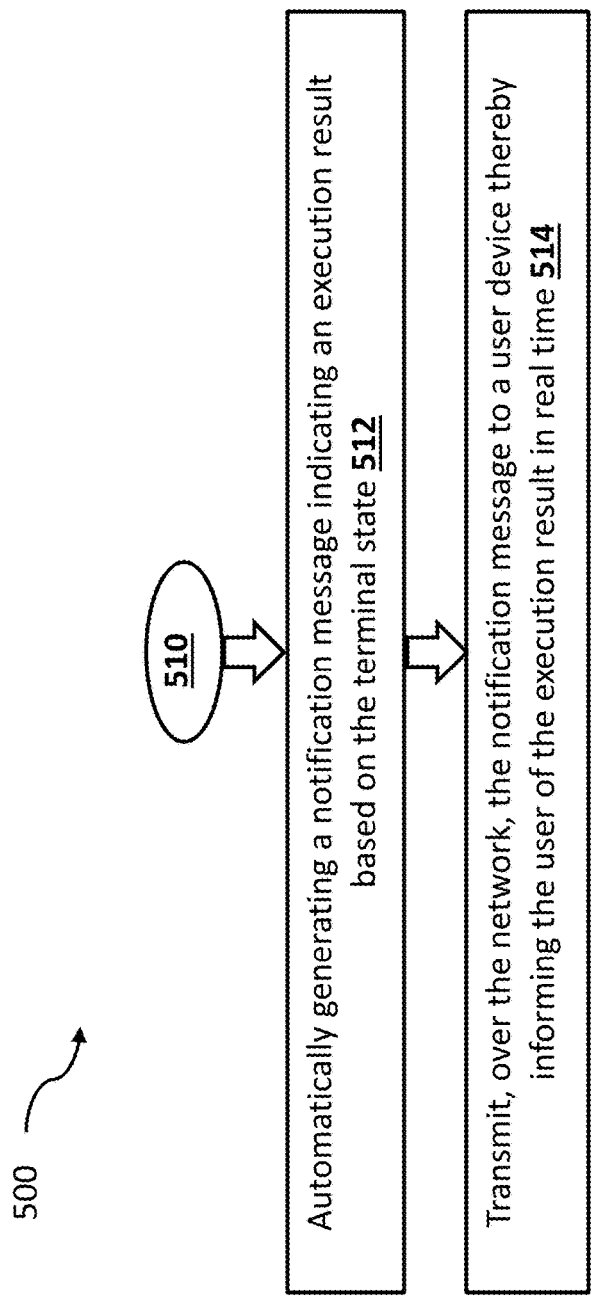

FIGS. 5A-5B provide a flow diagram of an exemplary process 500 for operating cloud-based application deployment using a user customized state machine, according to an embodiment. One or more of the processes of process 500 may be implemented, at least in part, in the form of executable code stored on non-transitory, tangible, machine-readable media that when run by one or more processors may cause the one or more processors to perform one or more of the processes. In some embodiments, process 500 may be performed by the server 130 in FIGS. 1-2. It is worth noting that additional processes, steps and/or implementations may be omitted, performed in a different sequence, or combined as desired or appropriate.

Figure 6A:
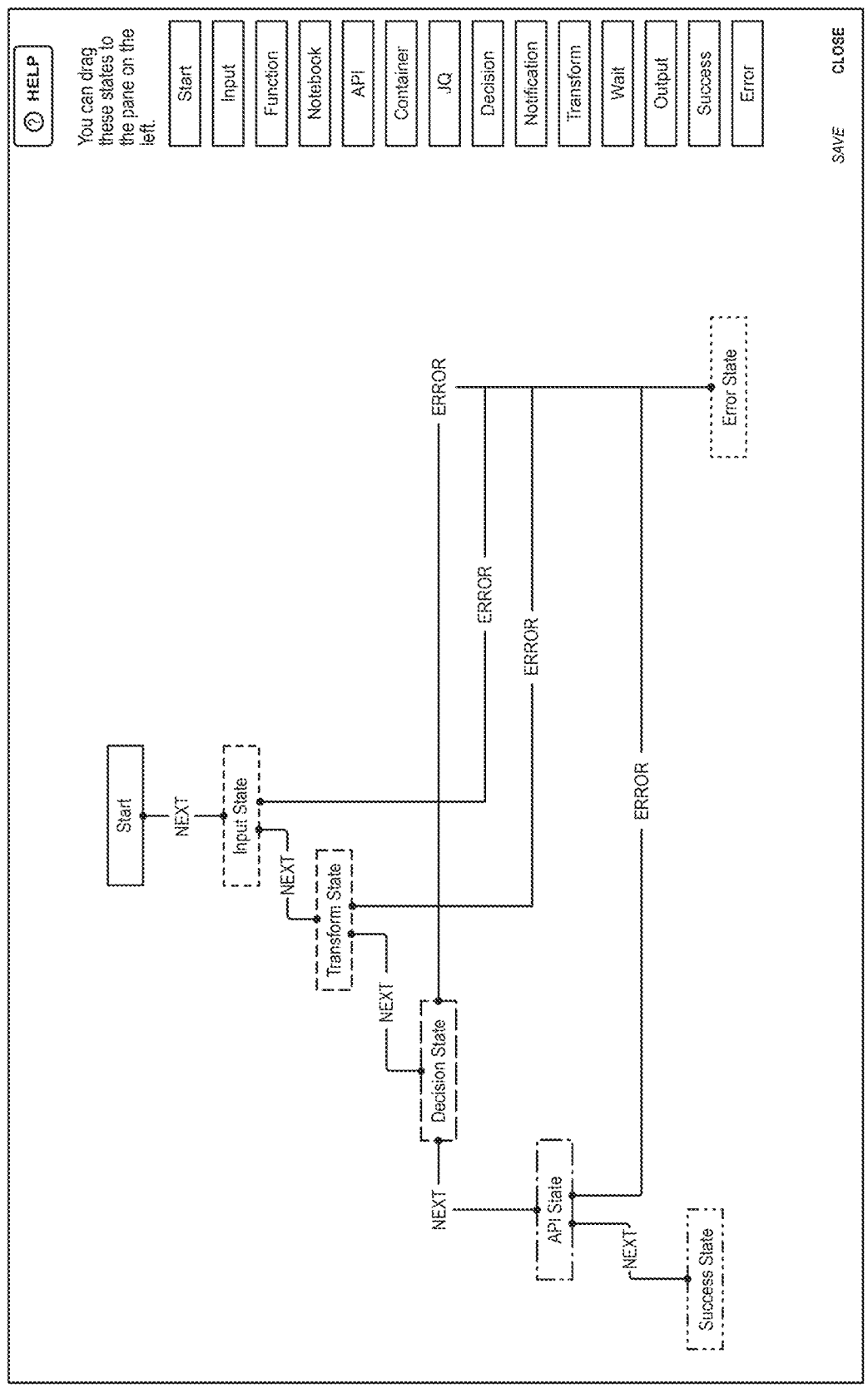
Figure 6B:
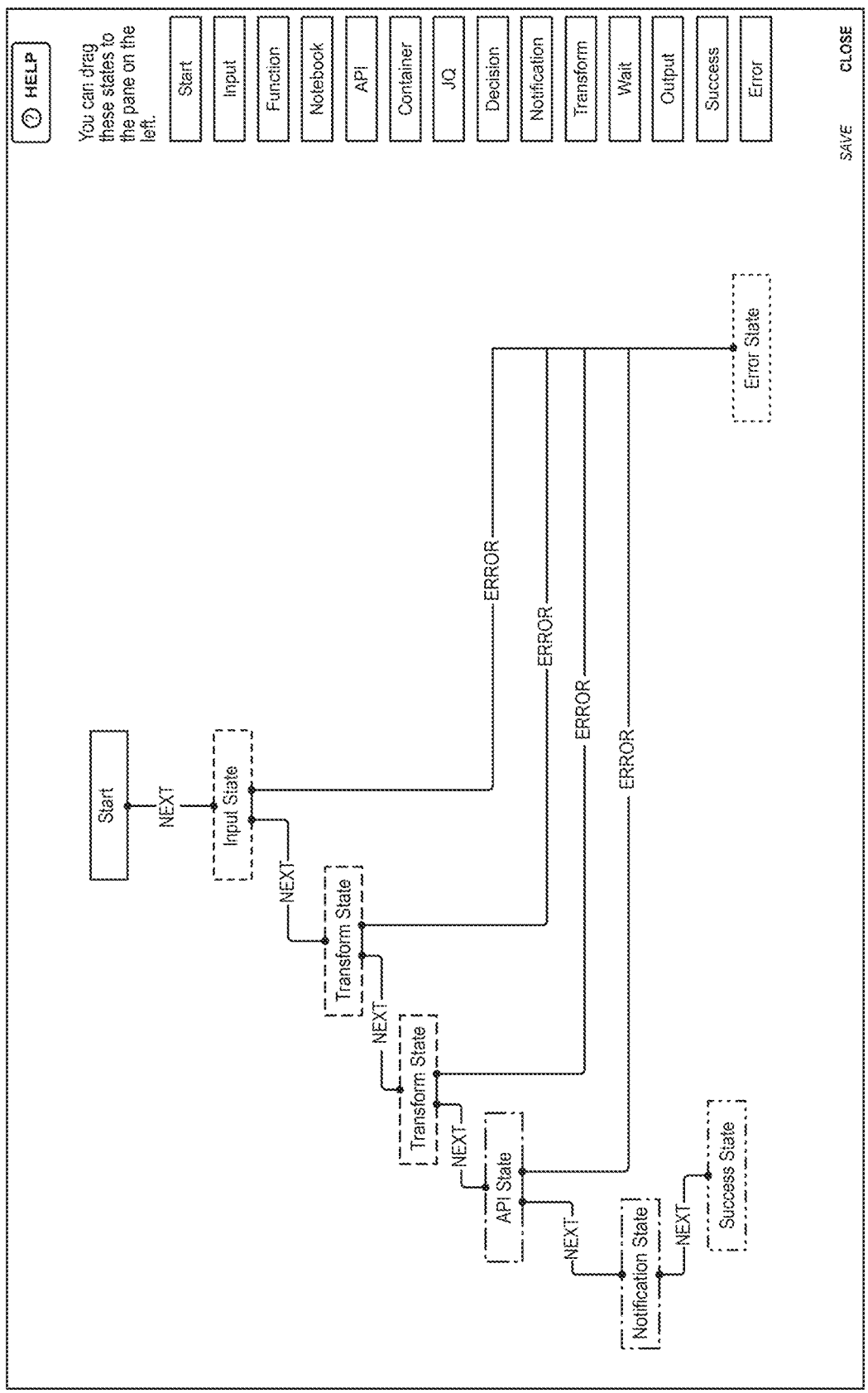

At step 502, remote access is provided, via a user interface and over a network, to a database of customizable states for a user. For example, as shown in FIGS. 6A-6B, a user may view and select a set of pre-defined and configurable states such as a source state that reads or writes artifacts from or to a target data store, a function state that invokes a workload offered by a cloud vendor, a branch state that perform a conditional logic to determine a next state, a transform state that transforms an input to a next state of a desired output, a log state that logs a current input at a current state, a notification state that sends a notification, and a success or failure state that terminates the state machine.

At step 504, user configurations may be received via the user interface and over the network, such as a first user configuration relating to a customized state machine process comprising a set of states, and connections between the set of states, and a second user configuration specifying parameters for each state from the set of states. For example, the first user configuration comprises one or more user selections of the set of states from the database of customizable states as "building blocks" shown in FIGS. 6A-6B. The user configuration further comprises at least one user defined connector connecting a first state to a second state from the set of states, and a user configured condition for the at least one user defined connector, e.g., "Next," "Error," etc. For another example, the second configuration comprises a user edit via a user interface modifying a code snippet implementing a respective state, as shown in FIGS. 6C-6D.

At step 506, a state machine may be created, comprising the set of states according to the first user configuration and the second user configuration, such as the customized state machine shown in FIG. 4. For example, creating a state machine may be performed by configuring and programming an FPGA and/or other types of programmable logic circuit with the set of states.

At step 508, the state machine is executed by monitoring state transitions among the set of set until the state machine terminates at a terminal state.

At step 510, transformed input data is stored at a memory during an execution of the state machine. For example, raw financial data may be received, over the network, from one or more external data vendor servers (e.g., 402 in FIG. 4). Thus, the state machine transits from an input state to a transform state, wherein the transform state generates the raw financial data to the transformed input data that is compliant with a pre-defined format.

At step 512, a notification message is automatically generated (e.g., at state 418 or 424 in FIG. 4) indicating an execution result based on the terminal state (e.g., failure state 420 or success state 426 in FIG. 4).

At step 514, the notification message is transmitted, over the network, to a user device thereby informing the user of the execution result in real time. Thus, in this way, the user is informed of the state machine execution progress in real time when the execution is successful or an error occurs. In another implementation, as the remote access may be provided on demand in response to a user request to create the state machine, the notification message may be generated in real time with the user request to execute a particular task, e.g., ETL, etc.

FIGS. 6A-6D provide example UI diagrams illustrating aspects of user configuration of the state machine execution process described in FIGS. 3-4, according to embodiments described herein. For example, as shown in FIGS. 6A-6B, the state machine controller 104 and/or the application deployment engine 105 may provide a user interface for a user to configure and define a plurality of states. Via the UI, the user may drag pre-defined and configurable states (e.g., "Start," "Input," "Function," etc.) as building blocks to create a state machine work flow. To define the transition rules between the states, a user may use a connector to connect selected states via the UI. For example, the user may initiate a connector line from state "Start" to the block "Input state" on the UI, and define the connector as "next." For another example, the user may initiate a connector line from the state "Transform" to "Error," and define the connector as "error."

In one embodiment, in FIGS. 6C-6D, a user may edit details of each state according to a specific application. For example, in FIG. 6C, a user may edit a string transformer. For another example, in FIG. 6D, the user may modify the definition and parameters of an API state.

Figure 7:
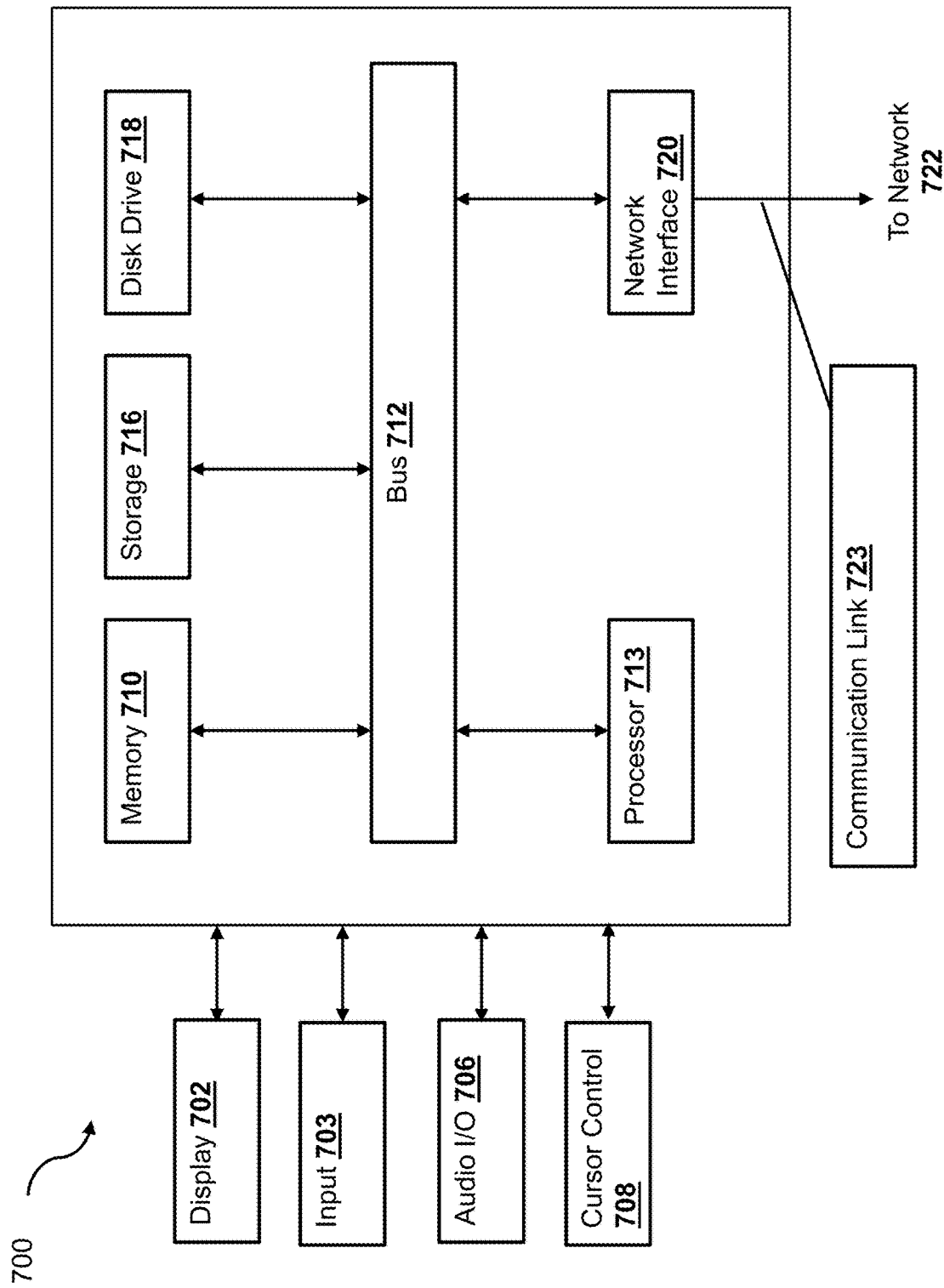
FIG. 7 is a block diagram illustrating example components of a computing device for implementing embodiments described herein, according to one embodiment.

FIG. 7 is a block diagram of a computer system suitable for implementing one or more components performing one or more processes described in FIGS. 1-6D, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the position detection of webpage elements described herein according to the process 300.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method for operating cloud-based application deployment using a user customized state machine, comprising:
providing, via a user interface and over a network, remote access to a database of customizable states for a user;
receiving, via the user interface and over the network, a first user configuration relating to a customized state machine process and a set of user-defined states, and connections between the set of user defined states, and a second user configuration specifying parameters for each state from the set of user defined states;
creating, by a processor, a state machine comprising the set of user defined states according to the first user configuration and the second user configuration, including one or more state machine pods each implemented on a hardware component, within which the set of user defined states evolve according to a set of transition rules;
executing, by the processor, the state machine including the one of more state machine pods by monitoring state transitions among the set of user-defined states within at least one of the one or more state machine pods until the state machine terminates at a terminal state,
wherein the state transitions defined by different sets of user-defined states deploy different specific applications on a cloud platform;
storing, at a memory, transformed input data during an execution of the state machine;
automatically generating a notification message indicating an execution result based on the terminal state; and
transmitting, over the network, the notification message to a user device that informs the user of the execution result in real time.

2. The method of claim 1, wherein the database of customizable states comprises any combination of:
a source state that reads or writes artifacts from or to a target data store;
a function state that invokes a workload offered by a cloud vendor;
a branch state that performs a conditional logic to determine a next state;
a transform state that transforms an input to a next state of a desired output;
a log state that logs a current input at a current state;
a notification state that sends a notification; and
a success or failure state that terminates the state machine.

3. The method of claim 1, wherein the first user configuration comprises:
one or more user selections of the set of user defined states from the database of customizable states;
at least one user defined connector connecting a first state to a second state from the set of user defined states; and
a user configured condition for the at least one user defined connector.

4. The method of claim 1, wherein the second configuration comprises:
a user edit via a user interface modifying a code snippet implementing a respective state.

5. The method of claim 1, further comprising:
receiving, over the network, raw financial data from one or more external data vendor servers.

6. The method of claim 5, wherein the executing the state machine further comprises:
transitioning from an input state to a transform state, wherein the transform state generates the raw financial data to the transformed input data that is compliant with a pre-defined format.

7. The method of claim 1, wherein the remote access is provided on demand in response to a user request to create the state machine.

8. A system for operating cloud-based application deployment using a user customized state machine, the system comprising:
a communication interface providing, via a user interface and over a network, remote access to a database of customizable states for a user, and receiving, via the user interface and over the network, a first user configuration relating to a customized state machine process comprising a set of user defined states, and connections between the set of user defined states, and a second user configuration specifying parameters for each state from the set of user defined states;
a memory storing a plurality of processor-executable instructions; and
one or more processors executing the plurality of processor-executable instructions to perform operations comprising:
creating, by a processor, a state machine comprising the set of user defined states according to the first user configuration and the second user configuration, including one or more state machine pods each implemented on a hardware component, within which the set of user defined states evolve according to a set of transition rules;
executing, by the processor, the state machine including the one of more state machine pods by monitoring state transitions among the set of user-defined states within at least one of the one or more state machine pods until the state machine terminates at a terminal state,
wherein the state transitions defined by different sets of user-defined states deploy different specific applications on a cloud platform;
storing, at a memory, transformed input data during an execution of the state machine;
automatically generating a notification message indicating an execution result based on the terminal state;
wherein the communication interface transmits, over the network in real time, the notification message to a user device.

9. The system of claim 8, wherein the database of customizable states comprises any combination of:
a source state that reads or writes artifacts from or to a target data store;

a function state that invokes a workload offered by a cloud vendor;
a branch state that performs a conditional logic to determine a next state;
a transform state that transforms an input to a next state of a desired output;
a log state that logs a current input at a current state;
a notification state that sends a notification; and
a success or failure state that terminates the state machine.

10. The system of claim 8, wherein the first user configuration comprises:
one or more user selections of the set of user defined states from the database of customizable states;
at least one user defined connector connecting a first state to a second state from the set of user defined states; and
a user configured condition for the at least one user defined connector.

11. The system of claim 8, wherein the second configuration comprises:
a user edit via a user interface modifying a code snippet implementing a respective state.

12. The system of claim 8, wherein the communication interface further receives, over the network, raw financial data from one or more external data vendor servers.

13. The system of claim 12, wherein the operation of executing the state machine further comprises:
transitioning from an input state to a transform state, wherein the transform state generates the raw financial data to the transformed input data that is compliant with a pre-defined format.

14. The system of claim 8, wherein the remote access is provided on demand in response to a user request to create the state machine.

15. A non-transitory processor-readable storage medium storing a plurality of processor-executable instructions for operating cloud-based application deployment using a user customized state machine, the plurality of processor-executable instructions executed by one or more processors to perform operations comprising:
providing, via a user interface and over a network, remote access to a database of customizable states for a user;
receiving, via the user interface and over the network, a first user configuration relating to a customized state machine process and a set of user-defined states, and connections between the set of user defined states, and a second user configuration specifying parameters for each state from the set of user defined states;
creating, by a processor, a state machine comprising the set of user defined states according to the first user configuration and the second user configuration, including one or more state machine pods each implemented on a hardware component, within which the set of user defined states evolve according to a set of transition rules;
executing, by the processor, the state machine including the one of more state machine pods by monitoring state transitions among the set of user-defined states within at least one of the one or more state machine pods until the state machine terminates at a terminal state,
wherein the state transitions defined by different sets of user-defined states deploy different specific applications on a cloud platform;
storing, at a memory, transformed input data during an execution of the state machine;
automatically generating a notification message indicating an execution result based on the terminal state; and
transmitting, over the network, the notification message to a user device that informs the user of the execution result in real time.

16. The non-transitory processor-readable storage medium of claim 15, wherein the database of customizable states comprises any combination of:
a source state that reads or writes artifacts from or to a target data store;
a function state that invokes a workload offered by a cloud vendor;
a branch state that perform a conditional logic to determine a next state;
a transform state that transforms an input to a next state of a desired output;
a log state that logs a current input at a current state;
a notification state that sends a notification; and
a success or failure state that terminates the state machine.

17. The non-transitory processor-readable storage medium of claim 15, wherein the first user configuration comprises:
one or more user selections of the set of user defined states from the database of customizable states;
at least one user defined connector connecting a first state to a second state from the set of user defined states; and
a user configured condition for the at least one user defined connector.

18. The non-transitory processor-readable storage medium of claim 15, wherein the second configuration comprises:
a user edit via a user interface modifying a code snippet implementing a respective state.

19. The non-transitory processor-readable storage medium of claim 15, wherein the operations further comprise:
receiving, over the network, raw financial data from one or more external data vendor servers.

20. The non-transitory processor-readable storage medium of claim 19, wherein the operation of executing the state machine further comprises:
transitioning from an input state to a transform state, wherein the transform state generates the raw financial data to the transformed input data that is compliant with a pre-defined format.

* * * * *